United States Patent [19]

Di Rosa

[11] 4,136,749
[45] Jan. 30, 1979

[54] DEVICE FOR CUTTING AND MEASURING PORTIONS OR LUMPS OF CAOUTCHOUC TO BE FED TO A MIXER FOR RUBBER

[75] Inventor: Gaetano Di Rosa, Pino Torinese (Turin), Italy

[73] Assignee: F.A.T.A. - Fabbrica Apparecchi di Sollevamento e Trasporto Ed Affini S.p.A., Turin, Italy

[21] Appl. No.: 889,806

[22] Filed: Mar. 24, 1978

[30] Foreign Application Priority Data

Jul. 15, 1977 [IT] Italy ............................... 68643 A/77

[51] Int. Cl.² ..................... G01G 19/04; G01G 19/52; B26D 7/00
[52] U.S. Cl. ........................................ 177/25; 177/50; 177/DIG. 11; 83/77
[58] Field of Search .................... 177/1, 25, 50, 123, 177/DIG. 11; 83/77

[56] References Cited

U.S. PATENT DOCUMENTS

| | | | |
|---|---|---|---|
| 3,175,438 | 3/1965 | Johnson | 177/25 X |
| 3,216,515 | 11/1965 | Roberts | 177/25 |
| 3,690,391 | 9/1972 | Rust | 177/1 |
| 3,846,958 | 11/1974 | Divan | 177/50 UX |
| 3,945,448 | 3/1976 | Sellers | 177/25 |
| 3,993,148 | 11/1976 | Keser et al. | 177/50 |

*Primary Examiner*—George H. Miller, Jr.
*Attorney, Agent, or Firm*—Sughrue, Rothwell, Mion, Zinn and Macpeak

[57] ABSTRACT

A machine for cutting up lumps of crude rubber (synthetic or natural) and weighing out an accurate quantity to be fed to a mixer in accordance with a selected formula, comprising two band saws having special blades with teeth having no "set" and lying entirely within the plane of the blades; crude rubber blocks are fed to a first of two band saws on two conveyor belts which pass one to either side thereof, one of the two conveyors being laterally displaceable and able to convey one of the portions into which the block of crude rubber is cut by the first band saw to be cut by the second band saw, the lateral position to which this portion is conveyed determining the relative size and therefore weight of the two pieces into which this portion is cut; all the cut portions and pieces are fed to an output conveyor which feeds them selectively to a hopper under the control of an automatic weighing machine.

11 Claims, 10 Drawing Figures

DEVICE FOR CUTTING AND MEASURING PORTIONS OR LUMPS OF CAOUTCHOUC TO BE FED TO A MIXER FOR RUBBER

The present invention relates to a device for cutting and measuring blocks or lumps of crude rubber to be fed to a mixer for rubber.

In the manufacture of rubber articles, especially tyres for motor vehicles, the basic process is that in which the mixes are prepared. The term "mix" as used in this specification will be understood to relate to a mixture of portions of crude rubber with one or more other ingredients such as carbon black, white fillers, sulphur or other chemicals introduced in order to obtain desired properties in the finished rubber. Preparation of the mixes starts with the formation of load units of crude rubbers of various types.

In order to form these load units it is necessary to handle, cut and measure with precision exact weights of various different types of crude rubber according to the particular formula being used (and there are a very wide range of different formulae known) because in any one formula or base unit a number of different types of crude rubber are always used.

Normally crude synthetic rubber is supplied to factories in roughly rectangular blocks of about 18 × 35 × 70 cm and weighing about 30 to 35 Kg, and crude natural rubber is supplied in roughly cubic lumps of about 55 cm per side weighing about 120 Kg.

Normally a mixer is able to accept lumps of dimensions up to those indicated for the crude synthetic rubber, so crude natural rubber has first to be cut up into small lumps.

At present the measuring operation is carried out by taking up a certain number of blocks or a certain number of small lumps sufficient to constitute a given weight which may be that given in the formula or a multiple of this weight. At this point it is necessary to carry out a first adjustment of the weight by cutting by sight one or more portions of one of the blocks or lumps. Subsequently a final adjustment has to be carried out in order to achieve sufficient accuracy.

The conventional and almost universally used system is one in which large cuts are made by means of a guillotine and small adjustment cuts are made by means of a hand held knife. However, making large cuts in raw rubber with the guillotine is not proper shearing but rather a splitting operation, and consequently it is not possible with the guillotine to make sufficiently accurate cuts, having regard to the fact that a tolerance of 1% is quite frequently required. Cutting with a hand knife has the disadvantage that the lumps or blocks of crude rubber, which may be of considerable weight, have to be handled manually.

It is known to use granulation techniques in some cases, but owing to the high adhesive nature of the materials involved in the manufacture of rubber the use of such methods has not been verymuch adpoted since the machines are very prone to clogging and loss of production time due to stoppages for clearing.

In all these known methods of cutting and measuring it has been essential to make the final adjustments manually in order to obtain the required accuracy.

The technical problem which the present invention seeks to solve is that of providing a cutting and measuring device for crude rubber (which term includes both natural and synthetic materials), which will be able to cut and measure, automatically, crude rubber, operating with the required accuracy and at a high rate such as is demanded commercially, especially by the large tyre manufacturing factories.

According to the present invention, there is provided a machine for cutting and measuring blocks or lumps of crude rubber to be fed to a mixer for rubber, characterised in that it comprises a first conveyor group including a first conveyor and a second conveyor which operate to convey articles placed thereon in the same direction to feed first and second cutting devices respectively, and an output conveyor which conveys to an automatic weighing machine the pieces of crude rubber cut by the cutting devices, the first conveyor being fixed in relation to the first cutting device, and the second conveyor being displaceable transversely in relation to the feed direction to the second cutting device, operation of the output conveyor which receives the pieces cut by the second cutting machine being controlled by the automatic weighing machine.

Embodiments of the invention can be made fully automatic so that they require no human intervention in order to complete the cutting and weighing. In addition, machines made as embodiments of the present invention do not suffer from the same clogging problem which were prevalent in granulators, and which could lead to stoppage of the whole plant for rather long periods.

Preferably, each cutting device is a bandsaw the blade of which is an endless loop, the teeth of which blade lie in the plane of the blade itself. In other words, the teeth of the blade are not "set" in the same way as are the teeth of saw blades used for wood cutting machines. A major advantage of this construction is that cutting of the crude or raw rubber can be effected at high speed without producing shavings and without inducing local overheating of the crude rubber which could cause degeneration in the quality of the mix. Likewise cutting can be effected without any need of lubricants which may not be compatible with the compositions of the mix; conventionally vaseline, glycerine or certain oils have been used as lubricants for cutting blades intended to cut rubber. Another advantage of this construction lies in the fact that the teeth of the blades do not cause the blade to require an excessively high driving force during the cutting action.

In one embodiment of the invention the first conveyor group comprises a fixed conveyor belt and a pair of second conveyor belts fixed in relation to one another but displaceable laterally in relation to the fixed belt, wherein the blade of the first cutting device passes between the fixed conveyor belt and the pair of laterally displaceable belts, wherein the blade of the second cutting device passes between two adjacent conveyor belts of a second conveyor group comprising a plurality of conveyor belts positioned between the said first conveyor group and the output conveyor, and wherein the lateral displacement of the pair of laterally diplaceable belts is controlled by the automatic weighing machine.

This machine, apart from performing the function of measuring, automatically, the quantity of crude rubber which goes into each formula, provides for cutting of all the blocks or lumps of crude rubber into two or three pieces so as to facilitate their conveyance and subsequent breaking up for mixing. Moreover the machine can be controlled by means of a calculator associated with the automatic weighing machine; this makes it possible to centralise a certain number of devices where the loads are prepared for all the mixers of a plant. The measurement takes place by direct comparison between the weight and length measured along one side of the lump or block of crude rubber.

In an alternative embodiment of the invention, the first conveyor group comprises a pair of conveyor belts between which there passes the blade of the first cutting machine, and a carriage movable back and forth in a direction parallel to that of the said pair of conveyor belts, and transversely and incrementally in relation to the feed direction of the second cutting device in order to cut successive slices from a block of crude rubber carried thereby, the output conveyor comprising a first output conveyor belt fed by the said pair of conveyor belts of the first conveyor group and a second output conveyor belt fed with slices of crude rubber cut by the second cutting device, the second output conveyor belt being controlled by the automatic weighing machine.

Two embodiments of the invention will now be more particularly described, by way of example, with reference to the accompanying drawings, in which.

Figure 1:
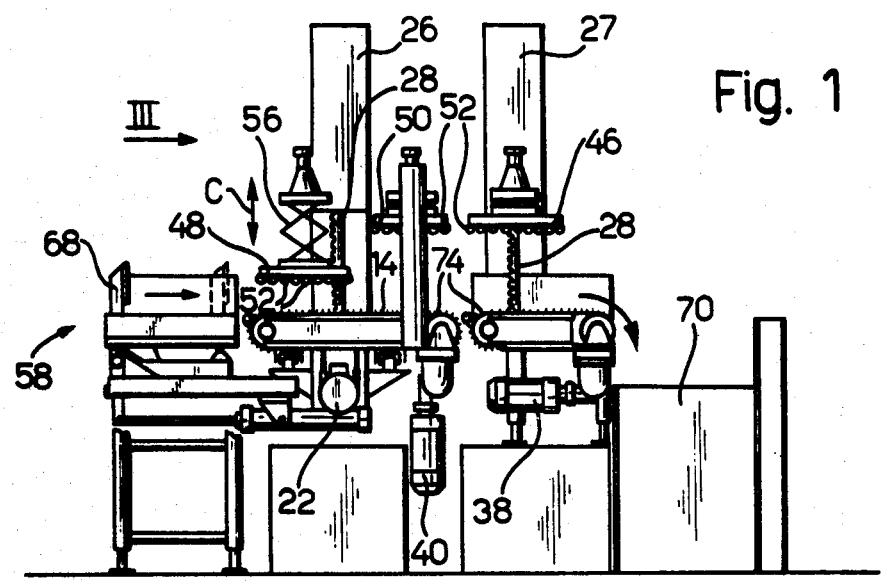
FIG. 1 is a diagrammatic side view of a first embodiment of the invention.
Figure 2:
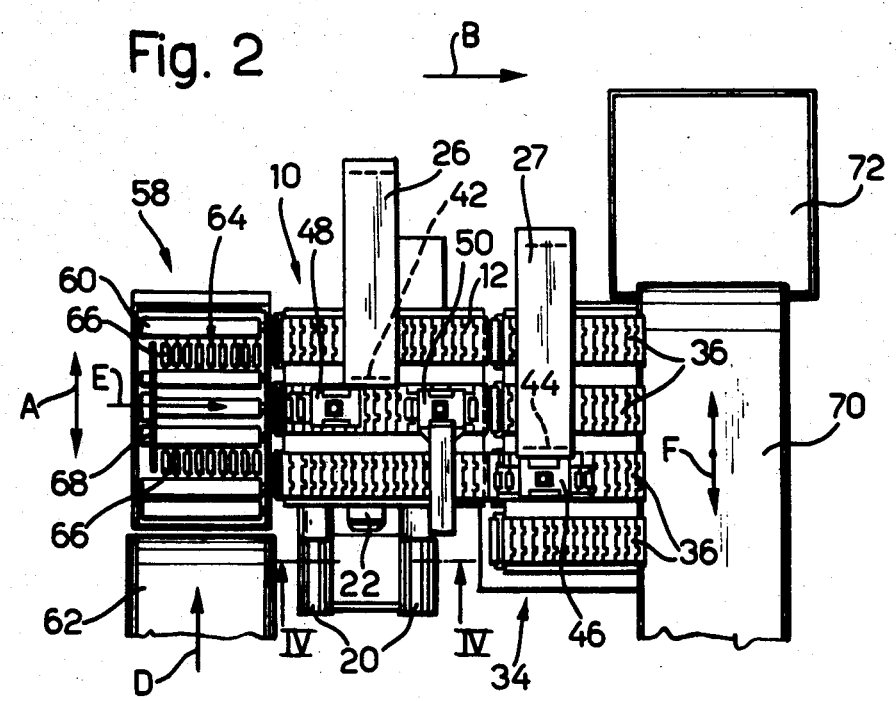
FIG. 2 is a plan view from above of the embodiment shown in FIG. 1.
Figure 3:
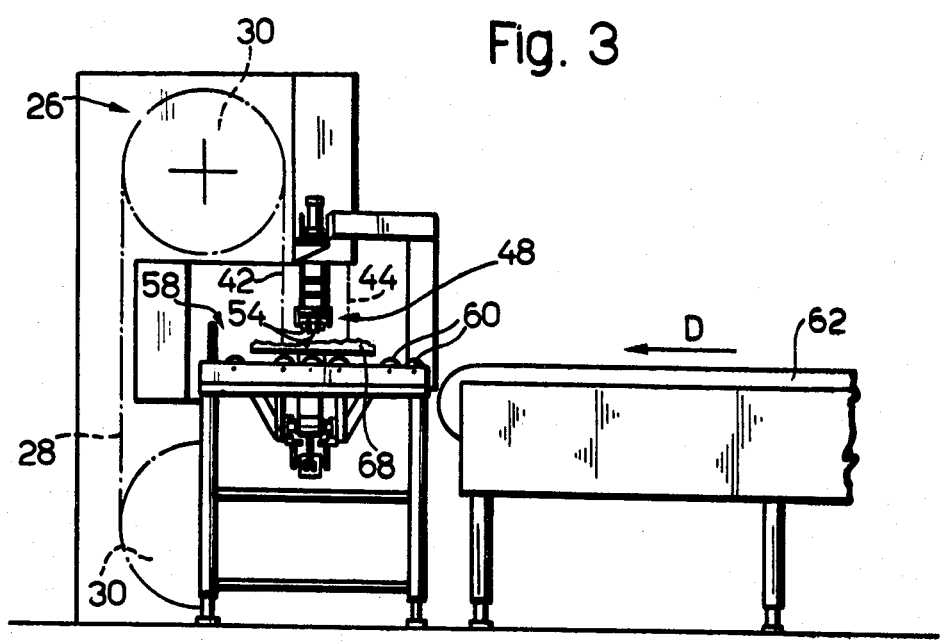
FIG. 3 is a view in the direction of the arrow III of FIG. 1.
Figure 4:
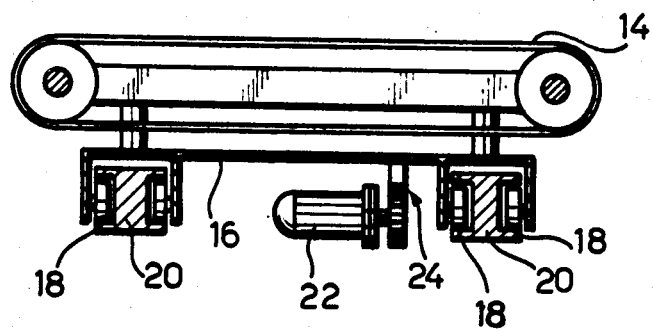
FIG. 4 is a diamgrammatic section, on a larger scale, taken on the line IV—IV of FIG. 2.

The machine illustrated in FIGS. 1 to 4 includes a first conveyor group 10 which comprises a fixed conveyor belt 12 and a pair of conveyor belts 14 fixed in relation to one another, but movable laterally in relation to the fixed belt 12 in the direction of the arrow A in FIG. 2. As illustrated in FIG. 4, the pair of laterally displaceable belts 14 is mounted upon a slide 16 having rollers 18 which roll on two parallel rails 20. The slide 16 is driven by a motor 22 which is coupled to the slide 16 by gears 24.

Figure 5:
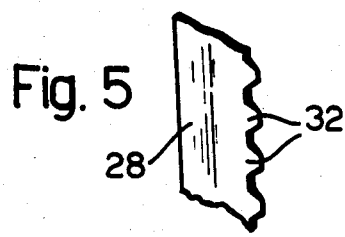
FIG. 5 is a partial perspective view of a saw blade which forms part of the machine illustrated in FIGS. 1 to 4.

The machine is further provided with two saws 26 and 27 each having a continuous saw blade 28. The continuous blade 28 of each saw 26, 27 is in the form of a band and each is guided by two cylinders 30, one of which is driven to rotate by a motor (not illustrated). As shown in FIG. 5, each continuous blade 28 is provided with teeth 32 which are not "set" as are the teeth of a conventional saw blade, but rather lie substantially in the plane of the blade 28.

Downstream of the conveyor group 10 there is located a second conveyor group 34 comprising a set of four conveyor belts 36 fixed laterally in relation to one another and the lateral spacing between which corresponds to the spacing between the two movable belts 14 of the first conveyor group 10. The four belts 36 are driven by a single common motor 38.

The fixed conveyor belt 12 of the first group 10 is driven by its own motor (not illustrated in the drawings) whilst the two movable belts 14 are driven by a common motor 40. The surfaces of all the belts in the first and second conveyor groups are provided with a plurality of projecting needles to grip the rubber blocks as they are conveyed.

In FIG. 2, the cutting and return parts of the loop of each of the band saw blades 28 are illustrated by broken lines, the cutting part of the blade 28 of the first saw 26 is indicated 42 and this section of the blade 28 passes between the fixed belt 12 and the pair of movable belts 14. The cutting part of the blade of the second saw 24 is indicated 44 and this section of the blade 28 passes between the two centre belts 36 of the conveyor group 34.

To the second saw 27 there is attached, to one side of the cutting part 44 of the blade 28, a presser 46 located above the belts 36 of the second conveyor group 34. Similarly, attached to the first saw 26 is a presser 48 which is located next to the cutting part 42 of the blade of the first saw 26. A third presser 50 is connected to the pair of movable belts 14 and is located above the belt of the pair which is adjacent to the fixed belt 12. This presser 50 is displaceable laterally of the conveying direction and moves with the pair of belts 14.

As can be seen in FIG. 1 each of the pressers 46, 48, 50 is provided with a plurality of idle rollers 52 the axes of which are orthogonal to the conveying direction of the belts (arrow B in FIG. 2). The rollers 52 are each provided with two radial flanges 54 spaced from their ends as can be seen in FIG. 3. The pressers 46, 48 and 50 can be displaced vertically up or down (arrow C in FIG. 1) by means of a pantograph device 56 (only one of which is illustrated in FIG. 1).

Upstream of the conveyor group 10 there is a loader device 58 which, as can be seen in FIG. 2, has a number of rollers 60 with axes parallel to the conveyor direction B of conveyor belts 12 and 14; the rollers 60 constitute the terminal area of a feed conveyor 62 the conveying direction of which is indicated by the arrow D in FIGS. 2 and 3. Between two pairs of rollers 60 there is interposed a lifter device 64 having two rows of short rollers 66 the axes of which are orthogonal to the axes of the rollers 60.

The loader 58 also includes a pusher 68 which can move between the two positions indicated in FIG. 1 (one shown in broken outline) to push blocks of crude rubber onto the conveyor group 10.

Downstream of the conveyor group 34 there is an output conveyor 70 which can move in either of two opposite directions as shown by the double arrow F of FIG. 2. When moving in one of the two directions the output conveyor 70 feeds a hopper 72 which leads to an automatic weighing machine which is not illustrated in the drawings.

The machine described above is intended for working according to three different cycles:

Cycle 1: automatic cutting and measuring of large quantities of crude rubber.

Cycle 2: automatic cutting and measuring of small quantities of crude rubber.

Cycle 3: cutting only by mannual control.

Figure 6:
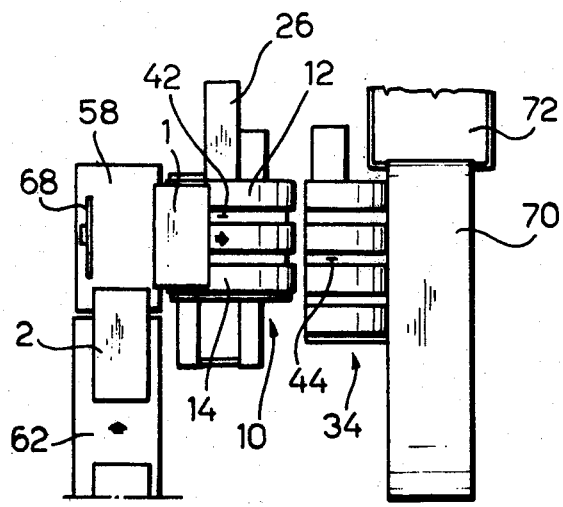
FIGS. 6 to 13 are diagrammatic plan views from above, illustrating various stages in a first cutting and measuring cycle of operation of the device shown in FIGS. 1 to 5.

The operation of the machine in cycle 1 is illustrated in FIGS. 6 to 13 to which reference will now be made. In FIG. 6 a block 1 of crude rubber has just been transferred from the feed conveyor 62 to the loader 58 and the pusher 68 has thrust it on to the conveyor group 10. The fixed conveyor belt 12 and the pair of movable conveyor belts 14 now convey the block 1 toward the cutting part 42 of the blade of the first saw 26. At the same time a second block 2 is being transferred from the feed conveyor 62 to the loader 58.

Figure 7:
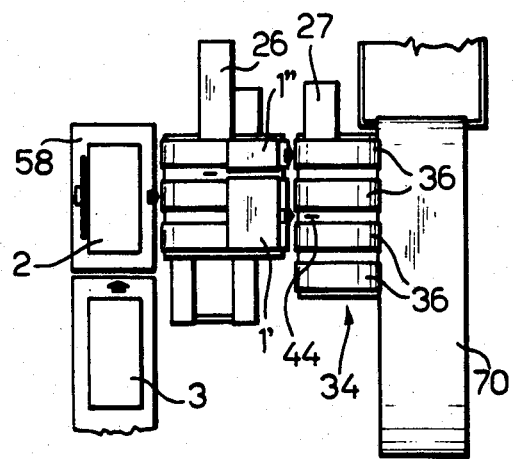

In the next stage, illustrated in FIG. 7, it is seen that the block 1 is cut by the first saw 26 into two parts 1' and 1"; during this cutting operation, the presser 48 is lowered and presses the block 1 against the conveyor belt below it thereby firmly engaging the needles 74 in the belt surface so as to hold the block 1 firmly during the cutting operation. The radial flanges 54 of the rollers 52 of the presser 48 serve to press into the rubber block and resist any tendency to lateral displacement.

After cutting the block 1 into two parts, there move on to the second conveyor group 34 and one of the cut parts is carried into contact with the cutting part 44 of the blade 28 of the second saw 27. Meanwhile the next block 2 has arrived on the loader 58.

Figure 8:
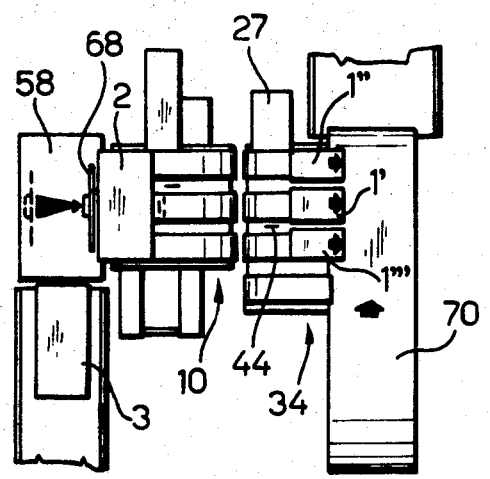

As illustrated in FIG. 8, the part 1' of the block 1 has now been cut by the second saw 27 into two parts 1' and 1''' and the three parts 1',1", and 1''' of the original block 1 are conveyed by the conveyor belts 36 onto the conveyor 70. During the cutting operation of the second saw 27, the portion 1' of the block 1 is pressed by the pressers 46 and 50 against the two conveyor belts below them.

Simultaneously with the second cutting of the block 1 the second block 2 is lifted by the lifter 46 above the upper plane of the rollers 60 and then thrust by the pusher 68 on to the conveyor group 10.

Figure 9:
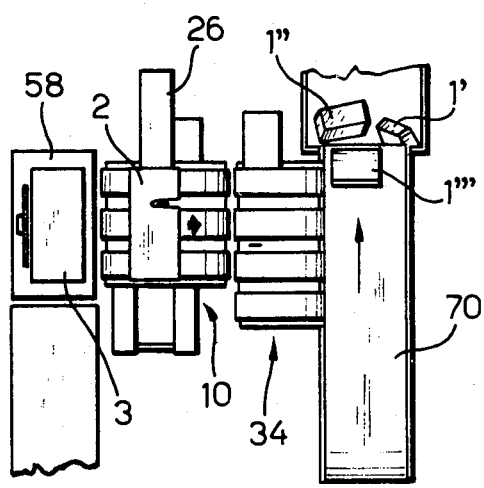

As illustrated in FIG. 9, the conveyor 70 then carries the three cut parts 1', 1", 1''' of the first block 1 towards the hopper 72 into which they fall, whilst the block 2 is being cut by the first saw 26 and a third block is being conveyed by the feed conveyor 62 onto the loader 58.

This continues in the same way until the automatic weighing machine (not shown) which may be any known mechanical, electrical or electronic weighing device, provides a signal that the required weight has almost been reached: the fraction of a block lacking in order to reach the desired weight is also indicated.

Figure 10:
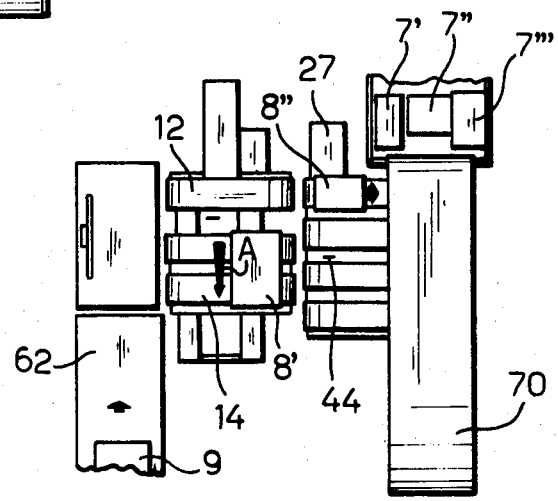

As illustrated in FIG. 10 this occurs when the eighth block has been cut by the first saw 26. The part 8' of the block 8 carried on the two laterally displaceable conveyors 14, is now carried transversely, in the direction of the arrow A, (the conveyors 14 being stopped or slowed) presenting the section 8''' for cutting by the second saw 27. The amount of movement of the pair of conveyors 14 is determined by the automatic weighing machine (not illustrated) and is linearly proportional to the amount of block to be cut in order to obtain an exact measure in the mix being made at this time.

Figure 11:
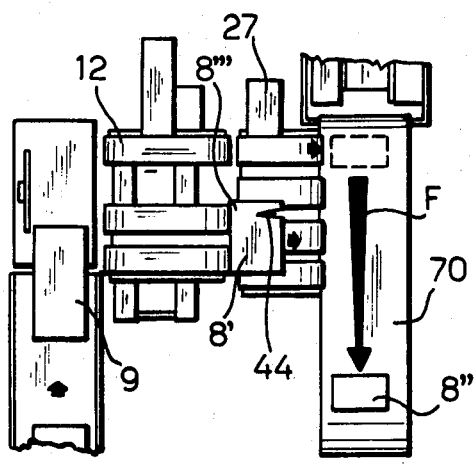

At the stage illustrated in FIG. 11, the blade of the second band saw 27 is cutting the part 8''' from the part 8' of the rubber block whilst the conveyor 70 is driven in the opposite direction from previously so that the part 8" cut from the block 8 by the saw 26 has been carried away from the hopper to a temporary storage position.

Figure 12:
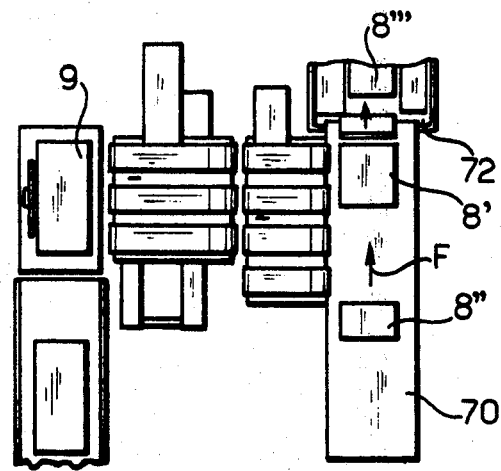
Figure 13:
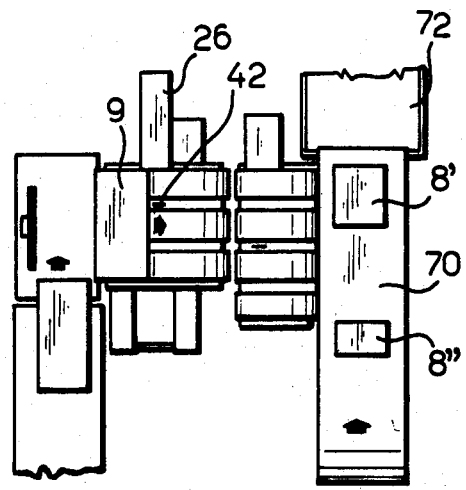

When the slice 8''' cut from the portion 8' of the block 8 arrives on the conveyor 70 the latter is stationary. As illustrated in FIG. 12, the conveyor 70 is then driven in its original direction of travel (arrow F of FIG. 12) until the slice 8''' falls from the end of the conveyor 70 into the hopper 72 of the automatic weighing machine, thus giving the required measurement. The conveyor 70 is then quickly stopped to retain the portion 8'. The hopper 72 is then unloaded on to the picking up belt 76 below it (see FIG. 23). The portions 8' and 8" which have remained on the conveyor 70 which was stopped immediately after the portion 8''' entered the hopper 72 to complete the desired weight will be the first pieces of crude rubber to enter the hopper of the automatic weighing machine at the beginning of the next weighing cycle, which then commences.

From the above description of the operation it will be seen that measuring of the crude rubber is carried out by first loading on to the automatic weighing machine the amount necessary to approach the required weight, after which the machine of the invention operates to cut one piece of crude rubber of a weight suitable for making up the required weight. The slice for making up the weight is taken from the centre part of the block, where the weight-to-length ratio is almost constant even though the shape of the block in cross-section may be very different from block to block.

The operating cycle (cycle 1) illustrated in FIGS. 6 to 13 is suitable for measuring loads from 100 to 300 Kg in weight. In FIGS. 14 to 21 there is illustrated another mode of operation (cycle 2) which is suitable for measuring loads up to a maximum of 100 Kg in weight.

Figure 14:
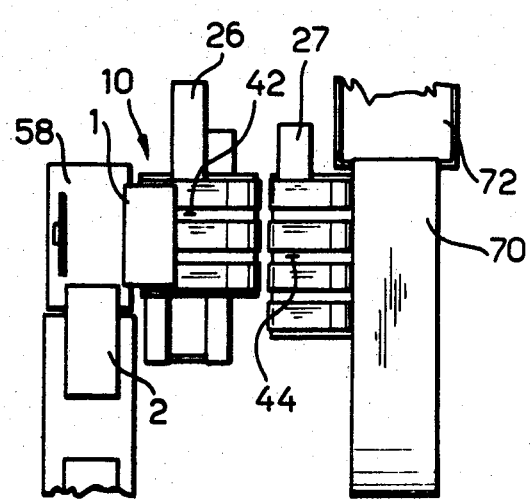
FIGS. 14 to 21 are diagrammatic plan views from above which illustrate a second operating cycle.
Figure 15:
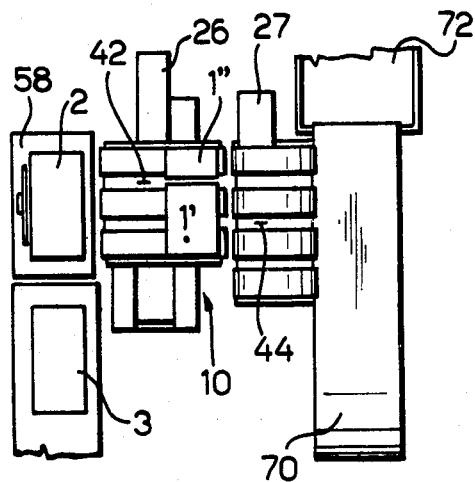
Figure 16:
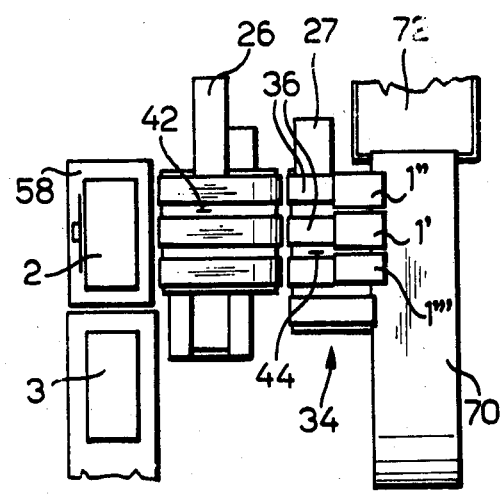

FIG. 14 resembles FIG. 6 in that it shows the first stage in the cycle, in which a block 1 is transferred on to the conveyor group 10 to be conveyed toward the cutting part 42 of the blade of the first saw 26 where the block 1 is divided into two portions 1' and 1" as shown in FIG. 15, and then forwarded by the conveyor belts of the conveyor group 10 so that the larger portion 1' is carried towards the cutting part of the blade of the second saw 27. In the meantime a second block 2 arrives on the loader 58.

Figure 17:
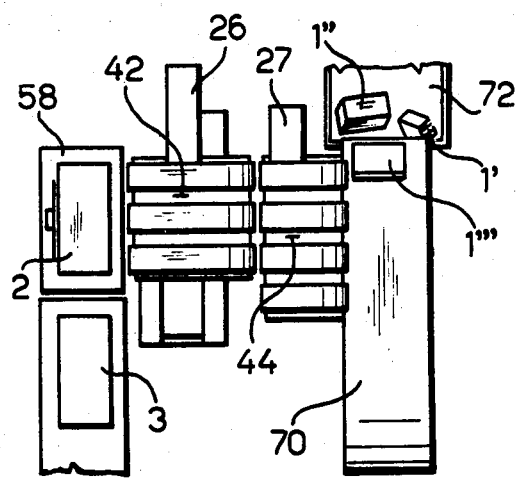

Whilst the block 2 remains stationary upon the loader 58 (see FIG. 16), the block 1, now cut into three portions 1' 1" and 1''' is carried by the belts 36 of the second conveyor group 34 toward the output conveyor 70. As illustrated in FIG. 17 the three portions 1', 1", and 1''' are then conveyed into the hopper 72 of the electronic weighing machine, which signals that the preselected weight has almost been reached and only one slice from a block is needed in order to reach this weight. The second block is then carried past the first saw 26 to cut off a first end portion 2".

Figure 18:
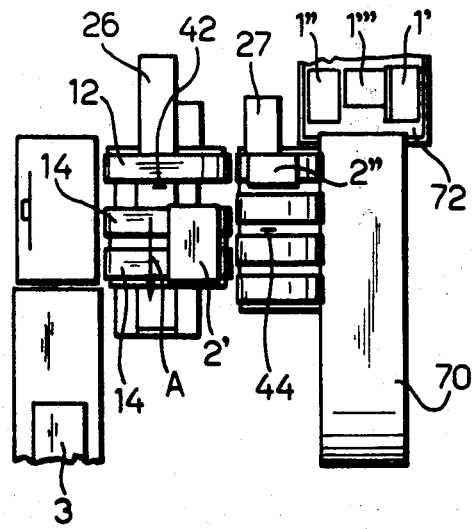

At this point, as illustrated in FIG. 18, the pair of laterally displaceable conveyor belts 14 upon which the main portion 2' is supported, are moved transversely in the direction of the arrow A, presenting the portion 2' for cutting by the blade of the second saw 27. In this case, too, lateral movement of the laterally displaceable conveyor belts 14 is linearly proportional to the weight of block required to be cut in order to obtain an exact measurement.

Figure 19:
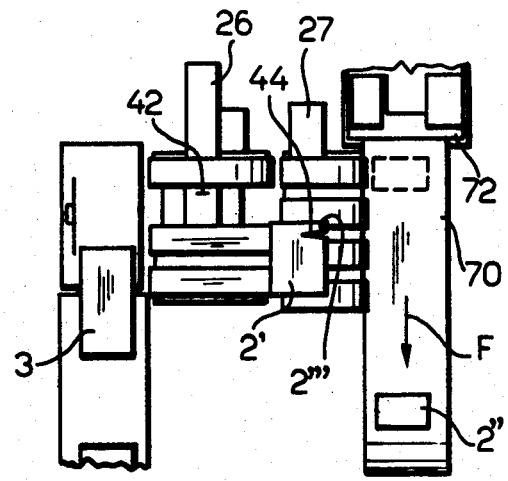
Figure 20:
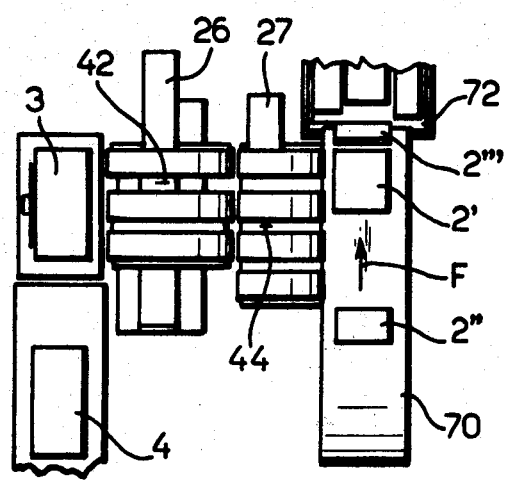

As illustrated in FIG. 19, as the cutting part 44 of the blade of the second saw 27 is cutting the portion 2' the portion 2" is being carried away from the hopper 72 (arrow F in FIG. 19) by the output conveyor 70, to a temporary storage position. Once the portion 2' is cut to remove the slice 2''' these two portions are then transferred on to the conveyor 70 which is halted; the conveyor 70 then resumes its normal direction of travel (arrow F in FIG. 20) and the slice 2''' cut from the centre of the block 2 is allowed to fall into the hopper 72 of the automatic weighing machine, to complete accurately the preselected weight of crude rubber to be transferred to the mix. In the next cycle of operation a block 3 is presented to the first saw 26 (see FIG. 21) whilst end portions 2' and 2'' of the block 2 which have remained on the conveyor 70, which stopped immediately after the preselected weight was reached to allow the hopper 72 time to discharge the measured crude rubber on to the pick up belt 76 below it, will be the first pieces of crude rubber to enter the hopper 72 of the automatic weighing machine.

The choice between cycle 1 and cycle 2 is made automatically by the machine based on the quantity of rubber necessary for the formula in preparation.

Cycle 3 (cutting by hand) can be performed by means of a selector (not shown), the operator controlling the lateral displacement of the two movable conveyors 14 in order to be able to carry out the measuring manually.

Figure 23:
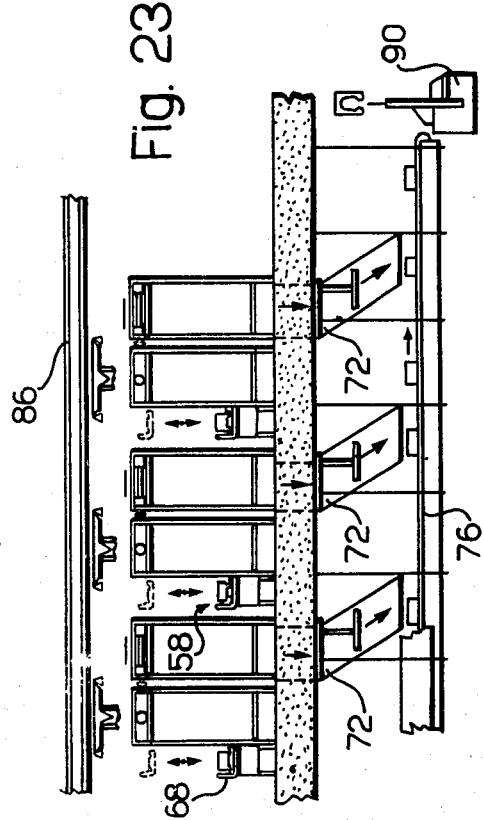
FIG. 23 is a diagrammatic view seen in the direction of the arros XXIII of FIG. 22.
Figure 21:
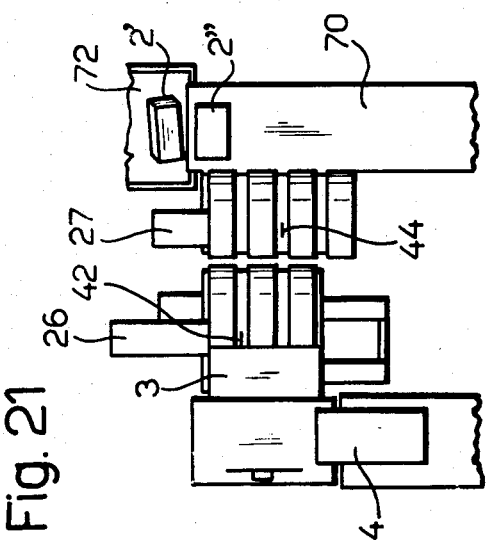
Figure 22:
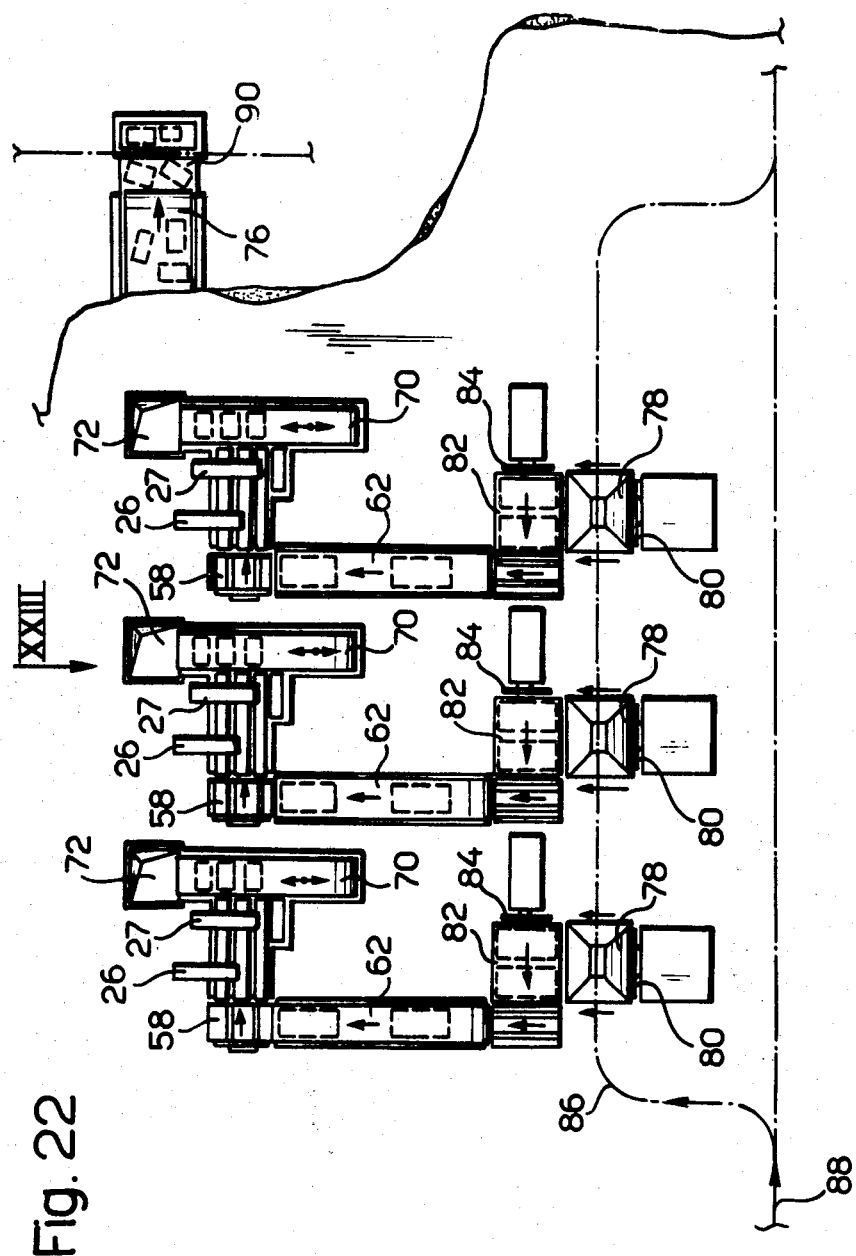
FIG. 22 is a diagrammatic plan view from above which illustrates a combination of three machines formed as embodiments of the invention.

As illustrated in FIGS. 22 and 23, several machines such as that described above can be connected in parallel, each one cutting and measuring a different type of crude rubber from the others. From FIGS. 22 and 23 it will be seen that in such an arrangement the feed conveyor 62 of each machine is fed by a loader 78 provided with a transfer device 80 which thrusts, simultaneously, two blocks into a collecting area 82 from which the blocks are loaded one after the other by a pusher 84 on to the feed conveyor 62. The loaders 78 are connected into a loop 86 of a feed line 88.

As illustrated in FIG. 23, the hopper 72 of each machine empties out on to a collector, or pick up belt 76 which carries the cut portions of crude rubber to an overhead conveyor 90 which carries the measured crude rubber to a rubber mixer.

Lubrication of the endless blades 28 of the two saws 26 and 27 is effected by means of a small quantity of water in a jet or a mist. Additives can be added to the water in order to avoid oxidisation of those parts of the blades which are most exposed. The high speed of cutting and the continuous and automatic feed make it possible to cut the blocks into several smaller lumps or portions with consequent advantage for the next stages of the process, and particularly for the initial operation of the rubber mixer (some portions can even arrive in the form of thin slices).

Figure 26:
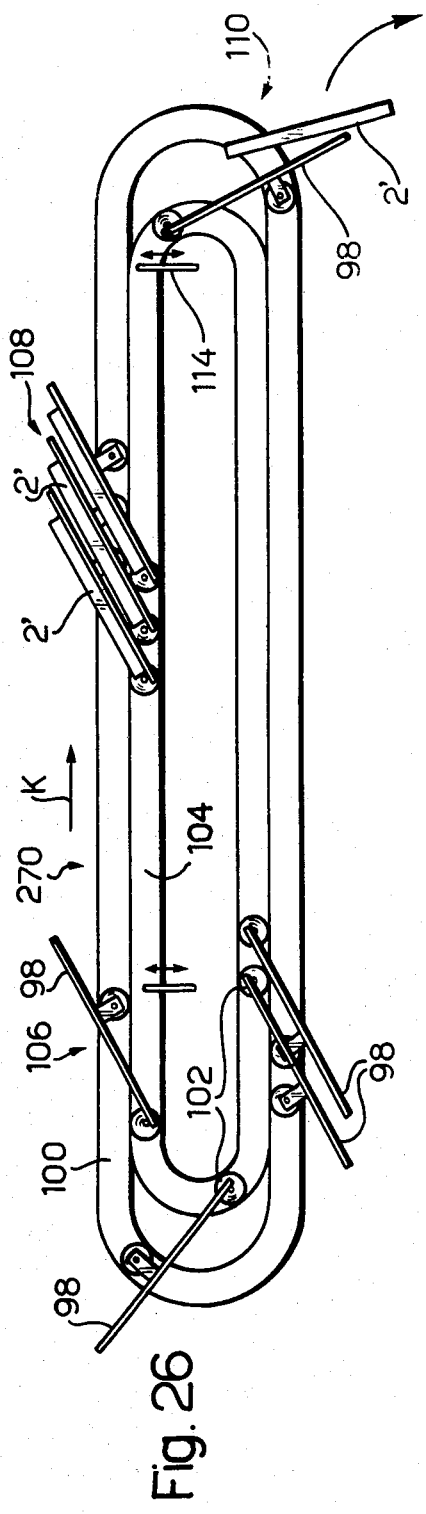
FIG. 26 is a diagrammatic view, on a larger scale, seen in the direction of the arrow XXVI of FIG. 25.
Figure 24:
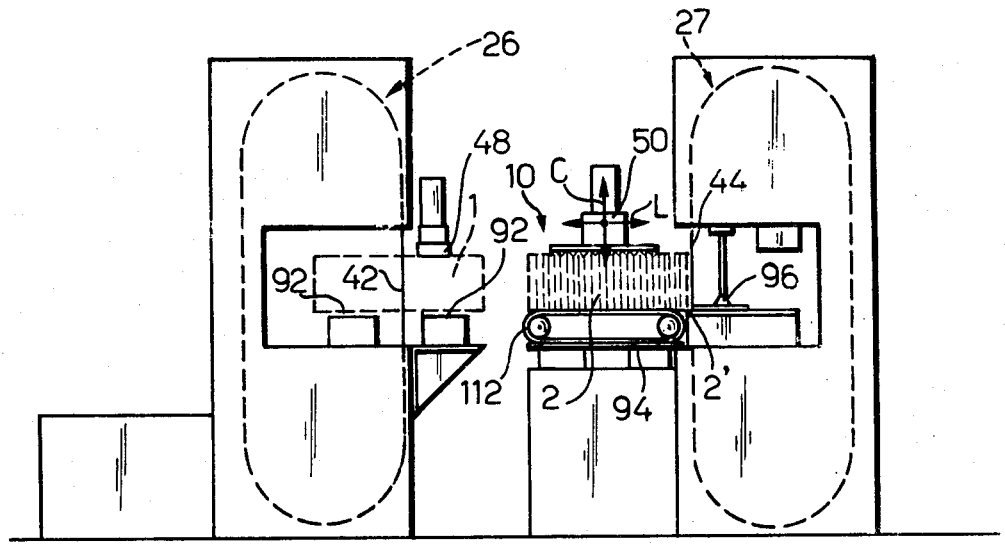
FIG. 24 is a diagrammatic front view of an alternative embodiment of the invention.
Figure 25:
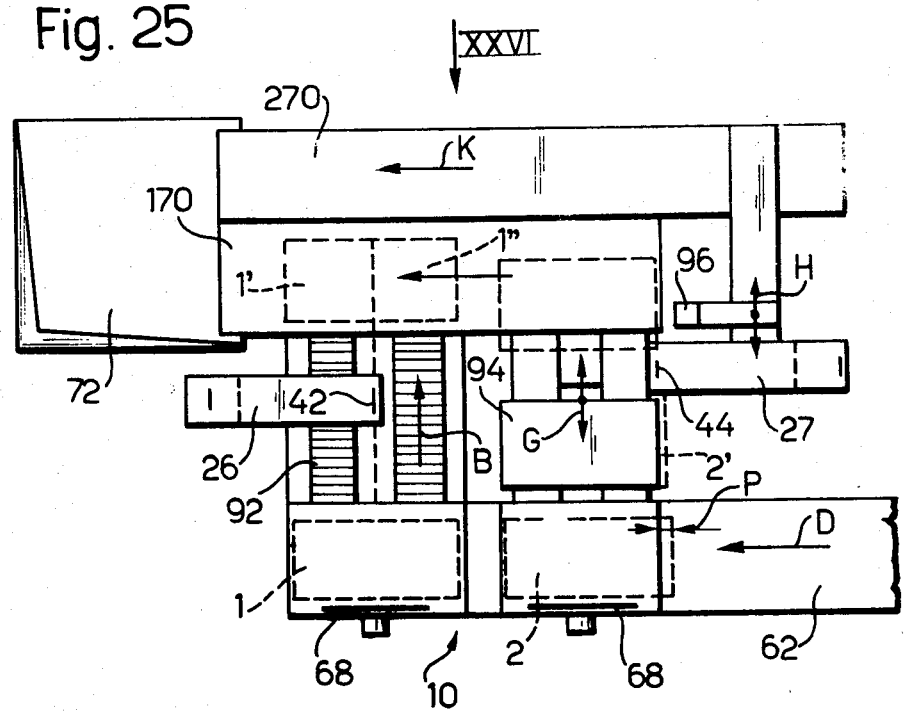
FIG. 25 is a plan view from above of the machine illustrated in FIG. 24.

In the alternative embodiment illustrated in FIGS. 24 to 26, the conveyor group 10 consists of a pair of conveyor belts 92 between which there passes the blade of a first band saw 26, and a carriage 94 movable back and forth in the direction of the double arrow G of FIG. 25, parallel to the direction of the conveyor belts 92 shown by the arrow B. The carriage 94 has a conveyor belt 112 by means of which a block of crude rubber such as the block 2 illustrated in FIG. 24, can be displaced laterally of the direction G. The conveyor 112 is driven to move incrementally by steps P. This movement displaces the block 2 transversely in relation to the cutting direction of a second band saw 27 and the carriage 94 is positioned such that the end 2' of block 2 can be cut by the band saw 27 as the block 2 is carried past by the carriage 94 whereby to cut a slice 2' from the block 2 at each pass.

Downstream of the pair of conveyor belts 92 and fed by these belts there is provided an output conveyor device comprising a first output conveyor 170 and a second output conveyor 270. Downstream of the second band saw 27 there is provided a conveyor 96 movable, parallel to the conveyors 92, in either direction as shown by the double arrow H. This conveyor 96 is designed to convey slices cut by the second band saw 27, one by one on to the second output conveyor 270 running parallel to the first output conveyor 170.

As illustrated in FIG. 26, the second output conveyor 270 consists of a series of inclined plates 98 which are driven by an endless chain 100. For this purpose an intermediate part of each plate 98 is pivotally connected to the chain 100. On one end of each inclined plate 98 is connected a roller 102 which is guided in an endless guide 104 situated on the inside of the loop of chain 100. During its travel in the direction indicated by the arrow K each inclined plate 98 passes through a loading area 106, a collector area 108 and a discharge area 110.

In operation of the machine the feed conveyor 62 carries two blocks 1 and 2 of crude rubber in front of respective pushers 68. The block 1 is transferred, by means of the pusher 68 on the left of FIG. 25, on to the pair of conveyor belts 92 which carry it past the first band saw 26 which cuts the block 1 approximately into two halves 1' and 1'' which are then transferred on to the first conveyor 170 which conveys them to a truck 72 which feeds the automatic weighing machine. As it passes the blade of the band saw 26 the block 1 is pressed by a presser 48 against the belt 92 to prevent it from slipping. As in the first embodiment the belts 92 may be provided with gripping needles or other gripping means.

The pusher 68 which is on the right of FIG. 25 conveys the block 2 on to the carriage 94 to which it is clamped by means of a presser 50. This presser 50 can move in the direction L, that is transverse the direction G, by a certain distance simultaneously with the incremental movement of the conveyor 112 carried on the carriage 94.

As a result of the back and forth movement of the carriage 94, in the direction of the arrow G, and of the incremental movement of the conveyor 112 on the carriage 94, a plurality of equal slices 2' are cut from the block 2; these are picked up one at a time by the conveyor 96 and transferred to the conveyor 270. Each of the slices 2' is placed on a respective inclined plate 98 of the second conveyor 270 when it is in the loading area 106. The chain 100 of the second output conveyor 270 draws the laded plates 98 from the loading area 106 to the collecting area 108, until halted by operation of a stop 114. At this point the loaded plates 98 stop and are disengaged from the chain 100 which continues to move incrementally picking up slices from the transfer conveyor 96 at the loading area and conveying them to the collecting area. The second output conveyor 270 also operates, upon order from the automatic weighing machine, reengage loaded plates 98 at the collecting area and thereby to transfer a required number of slices 2'' of raw rubber into the hopper 72.

The total measurement of the preselected weight of crude rubber is therefore carried out by loading on to the automatic weighing machine with the conveyor 170 a number of half portions of blocks, such as the portions 1', 1''' of the block 1, sufficient to reach nearly, but short of, the desired weight, and the weight is then made up accurately by adding a certain number of slices 2' by operating the conveyor 270.

In the design of the machine of this invention, two problems are solved: first the problem of handling the highly adhesive material, and secondly the problem of making portions which are small enough to achieve the desired accuracy, this latter being achieved by the second band saw 27 the teeth 32 of the blade 28 of which are not set.

Cutting by means of such a band saw makes it possible, if necessary, to produce slices down to about 5 mm thick, which can be easily handled since they have an even surface which is large enough to be gripped by the conveyor 96 which may have feeding suckers or similar devices by means of which one slice at a time may be handled.

The block 2 from which the slices 2' are made is not cut entirely into slices owing to the difficulty of holding and guiding the remaining portion to be cut when this becomes too small. The slices 2' are made only from about the first half of the block 2, after which the remaining portion is automatically ejected from the carriage 94 on to the first conveyor 170.

The machine illustrated in FIGS. 24 to 26 operates in a rather different way from that of the machine described in relation to FIGS. 1 to 4. This machine cuts blocks of crude rubber into pieces of two substantially different sizes. The pieces of the first size have a weight of about 15 Kg and are made by cutting the blocks into two parts; the pieces of the second size have a weight of about 0.5 Kg are made by cutting from the block a plurality of slices which are usually about 10 mm thick.

Whilst in the first embodiment illustrated in FIGS. 1 to 23 measuring is effected by using the ratio between length and weight of the block, measuring in the embodiment of FIGS. 24 to 26 is based on the use of a number of equal slices to make up the preselected weight to the nearest 0.5 Kg. This can be within 1% accuracy if a suitably large preselected weight is used.

What is claimed is:

1. A machine for cutting and measuring blocks or lumps of crude rubber to be fed to a mixer for rubber, comprising:
   a first conveyor group including a first conveyor and a second conveyor operating to convey articles placed thereon in the same direction,
   first and second cutting devices respectively fed with blocks of crude rubber by said first and second conveyors of said first conveyor group,
   an output conveyor,
   an automatic weighing machine,
   means for conveying pieces of crude rubber cut by said cutting devices to said output conveyor which transfers them to said automatic weighing machine, said first conveyor being fixed in relation to said first cutting device, and said second conveyor being displaceable transversely in relation to the feed direction of said second cutting device, and
   means for controlling the operation of said output conveyor which receives the pieces of crude rubber cut by said second cutting device in dependence on output signals from said automatic weighing machine.

2. The machine of claim 1, wherein each said cutting device is a bandsaw having an endless loop blade the teeth of which lie in the plane of the blade itself.

3. The machine of claim 1, wherein said first conveyor group comprises:
   a fixed first conveyor belt, and
   a pair of second conveyor belts which are fixed in relation to one another but displaceable laterally in relation to said fixed first conveyor belt,
   a second conveyor group comprising a plurality of conveyor belts positioned between said first conveyor group and said output conveyor,,
   said first cutting device being positioned such that the blade thereof passes between said fixed first conveyor belt and said pair of laterally displaceable conveyor belts, and said second cutting device being positioned such that the blade thereof passes between two adjacent conveyor belts of said second conveyor group, lateral displacement of said pair of laterally displaceable conveyor belts of said first conveyor group being controlled by said automatic weighing machine.

4. The machine of claim 1, wherein upstream of said first conveyor group there is located a pusher device operating to feed blocks or lumps of crude rubber one at a time onto said conveyors of said first conveyor group.

5. The machine of claim 1, wherein all said conveyor belts of said first conveyor group are provided with projecting pins for engaging said blocks or lumps of crude rubber onto said conveyor belts.

6. The machine of claim 1, wherein each said cutting device has at least one associated presser device opearable to press a block or lump of crude rubber against the underlying conveyor during the cutting operation.

7. The machine of claim 6, wherein each said presser device includes a plurality of idler rollers the axes of which are orthogonal to the conveying direction of the underlying conveyor belt, said cylinders being provided with radial flanges intermediate their ends.

8. The machine of claim 1, wherein said first conveyor group comprises:
   a pair of conveyor belts between which there passes the blade of said first cutting device, and
   a carriage movable back and forth in a direction parallel to that of said pair of conveyor belts, and transversely and incrementally in relation to the feed direction of said second cutting device in order to cut successive slices from a block of crude rubber carried thereby,
   said output conveyor comprising:
   a first output conveyor belt fed by said pair of conveyor belts of said first conveyor group, and
   a second output conveyor belt,
   means feeding said second output conveyor belt with slices of crude rubber cut by said second cutting device,
   said means controlled by said automatic weighing machine for controlling said output conveyor operating to control the movement of said second output conveyor belt.

9. The machine of claim 8, wherein said means feeding said second output conveyor belt with slices of crude rubber cut by said second cutting device is an associated conveyor.

10. The machine of claim 8, wherein said second output conveyor belt comprises:
    a plurality of inclined plates,
    an endless loop of chain guided by two sprockets driving said plurality of plates from a loading position, through a collecting position, to an unloading position, which latter is situated at or adjacent one of said sprockets over which said endless chain is guided.

11. The machine of claim 8, wherein upstream of each of said two conveyor belts of said first conveyor group there is provided a pusher device operating to feed blocks or lumps of crude rubber one at a time to the respective conveyor.

* * * * *